June 3, 1969     F. J. CAMARATA     3,447,383
TWIN VORTEX ANGULAR RATE SENSOR
Filed Jan. 4, 1966
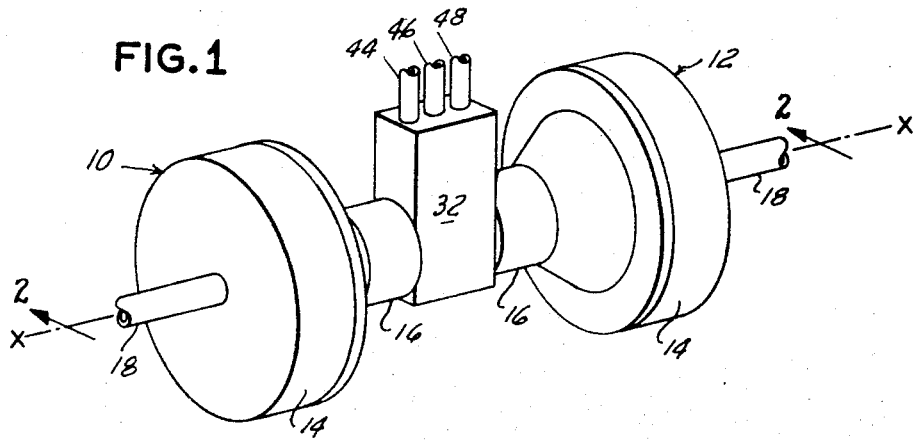
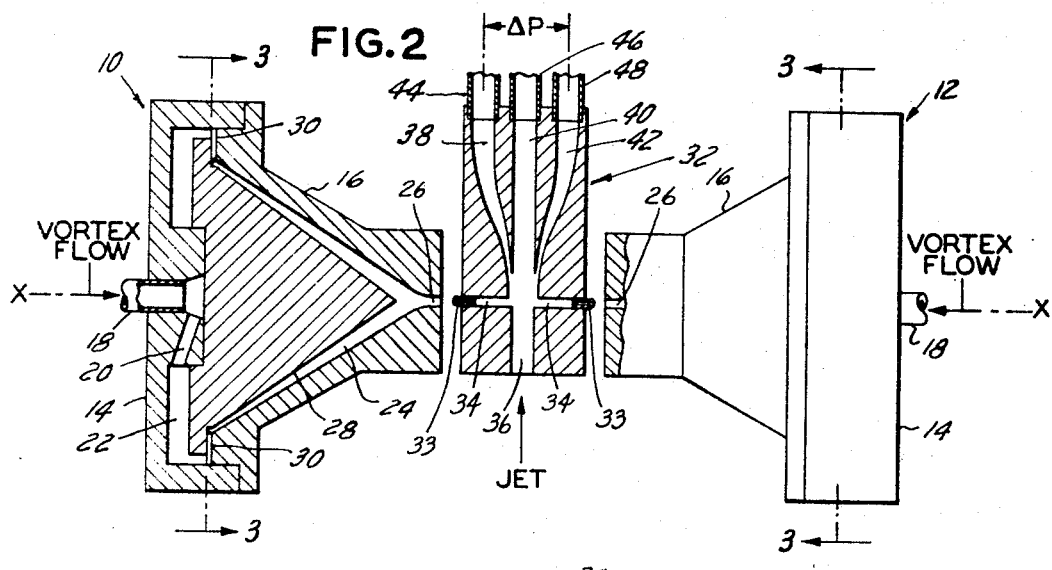
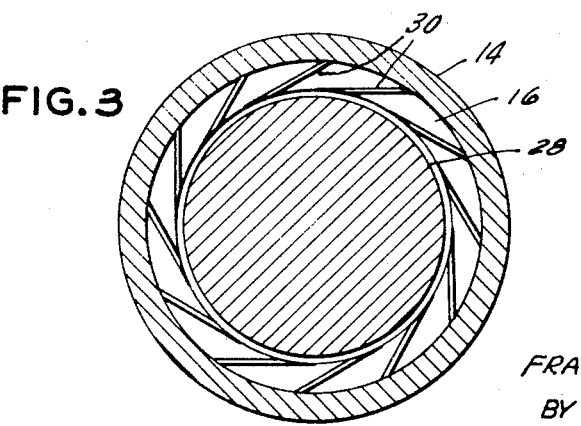
INVENTOR
FRANK JUSTIN CAMARATA
BY
McCormick, Paulding & Huber
ATTORNEYS

United States Patent Office 3,447,383
Patented June 3, 1969

3,447,383
TWIN VORTEX ANGULAR RATE SENSOR
Frank Justin Camarata, Wapping, Conn., assignor to United Aircraft Corporation, East Hartford, Conn., a corporation of Delaware
Filed Jan. 4, 1966, Ser. No. 518,726
Int. Cl. G01f 1/00
U.S. Cl. 73—505                                6 Claims

ABSTRACT OF THE DISCLOSURE

A device using two counter-moving or counter-rotating vortices to sense the rate and direction of rotational movement of a body about a reference axis wherein the vortices are generated in a pair of non-rotating chambers by the injection of fluid in such chambers.

---

As will be more fully understood from the detailed description, the present invention contemplates the provision of two counter-moving or counter-rotating vortices, each having its axis or centerline coincident with the axis about which movement of the body is to be sensed. The output flow or pressure of each vortex is compared with that of the other, and the differential of such output pressures, or flows, provides a signal indicative of the rate and direction in which a body containing such vortices is turning on the said axis.

The body itself can define the chambers which are adapted to induce counter-rotating vortex flow of a fluid, such as air, but in most installations it will be more desirable to provide the angular rate and direction sensing device as a separate unit having two vortex generators wherein the respective chambers are defined. Preferably, this unit will also include a distinct means for comparing the vortex outputs and amplifying any signal resulting from a differential in pressure or flow from said outputs. Obviously, the signal thus produced and amplified can be used to indicate the direction and rate of turn or angular movement of the body about the reference axis, and it can also be used to operate a control mechanism which functions either to help the body make the rotation or to prevent the body from making the rotation.

Thus, it will be seen that the present invention provides a device generally similar in function to a gyroscope, and it can be said that it is the general object of the invention to provide a device capable of sensing the rate and angular direction of movement of a body about a reference axis and capable also of producing a signal indicative of said rate and direction so that the signal can be used in control of the angular movement of the body.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a schematic perspective view of a device provided in accordance with the present invention;

FIG. 2 is an elevational view, partly in vertical section, still rather schematic, of the device shown in FIG. 1; and FIG. 3 is a transverse vertical sectional view taken as indicated by each of the lines 3—3 of FIG. 2.

As mentioned above, the present invention contemplates the provision of a pair of counter-moving or counter-rotating vortices formed with their centerlines on a common axis which is coincident with the axis about which movement of a body is to be measured. In the preferred form of the invention, the vortex chambers are not formed in the body per se, but are defined in a pair of vortex generators 10 and 12 supported by the body on a common axis X—X about which movement of the body is to be sensed. One vortex body is the same as the other, but it may take a wide variety of forms. In the form schematically illustrated, the vortex generator comprises an outer cap or cover 14 which closes upon a body 16. An inlet 18 is preferably formed centrally on the cover 14 and thus on the axis X—X to accommodate the flow of fluid, such as air, into the generator. More specifically, the inlet 18 communicates with one or more radial passages 20 which direct the fluid to a plenum chamber 22 formed within the cap or cover 14 between it and the body 16.

The generator body 16 defines a substantially conical chamber 24 which is the vortex chamber of the generator, this chamber having its widest diameter adjacent the cap or cover 14 and having an axial outlet 26 for the fluid, or at least a portion thereof, after it has completed the vortex flow. The vortex flow within the chamber 24 is induced around a substantially conical plug 28, the flow of fluid being introduced to the chamber 24 around the plug 28 by generally tangential passages 30, 30 providing communication between the plenum chamber 22 and the vortex chamber 24. These passages 30, 30 are formed on the outer end of the body 16, but they can be formed in a separate ring attached to said body. As will be seen in FIG. 3, the passages 30, 30 are arranged so as to induce counterclockwise rotation of the fluid leaving the plenum chamber and moving into the vortex chamber. Since this flow will be counterclockwise as viewed from the outside or cover side of each generator 10 and 12, it will be seen that the direction of movement in one chamber will be opposite to that of the movement in the other chamber with reference to their common centerline or axis X—X.

Now, it is well known that the pressure of the fluid at the inlet and at the widest diameter portion of the vortex is greater than that at the center of smallest diameter portion thereof. Thus, the pressure of the air or other fluid passing though the vortex generators will be greater at each inlet 18 or plenum chamber 22 or vortex passage 30 than it will be at the central outlet 26 for the vortex on the axis X—X. Obviously, the vortex chambers and generators being substantially identical, the pressure at each vortex outlet 26 will be the same as that at the other similar outlet provided each vortex generator receives its air supply from the same source or at the same pressure. Preferably, the fluid is supplied at each inlet 18 under positive pressure exceeding the ambient pressure.

In the preferred form of the invention, the fluid pressure near the center of one outlet 26 is compared to that near the center of the other outlet 26 in a pressure and/or flow amplifying signal establishing device 32. In order to pick up and compare the pressures at the respective outlets 26, 26 the device 32 is provided with a pair of signal pick-up tubes 33, 33 which faces the centers of the said respective outlets in the generators 10 and 12, the bores of the tubes 33, 33 being smaller than the bores of the outlets 26, 26. Further, the generators 10 and 12 are spaced apart on the axis X—X, and their said outlets are spaced from the amplifying device 32 and from the signal pick-up tubes 33, 33.

The preferred signal amplifying device 32 has a rectangular body provided with a bore 34 extending through the body to support the tubes 33, 33 which face the respective vortex outlets 26, 26. Thus, the flow from one outlet is directly opposed to the flow from the other. The amplifier body is also provided with an inlet passage 36 which extends transversely of the bore 34 and which communicates with a plurality of outlet passages. Preferably, there are three outlet passages 38, 40 and 42 which extend into conduits 44, 46 and 48, respectively.

In the operation of the sensing device, a steady stream or jet of air or other fluid is directed under pressure into the amplifying inlet passage 36 to flow towards its outlet passages 38, 40, and 42. Under conditions existing when there is no rotation of the body about the axis X—X, there will be equal flow and equal pressures at the outlets 26, 26 and, the flow in opposite direction in the bore 34 from the said outlet will cancel each other and thus they will not tend to divert the stream or jet of air from a straight path in the inlet passage 36. Accordingly, the major portion of the stream will flow from the inlet passage 36 into the central outlet passage 40. In any event, since the connections between the respective outlet passages 38 and 42 and the inlet passage 36 are identical and equally spaced on opposite sides of the inlet passage, the flow in the outside outlet passages 38 and 42 and the pressures therein will be equal or substantially equal. This balanced condition indicates no rotation of the body on the axis X—X.

In the event of movement of the body on the axis X—X in either direction, such movement will naturally be in the direction of one vortex and opposite to the direction of the other, thus strengthening one vortex while weakening the other to create a differential in the respective outlets 26, 26 and a change in the momentum of flow therethrough. For example, if movement of the body is in one direction on the axis X—X, it will reduce the pressure and momentum of flow near the center of the outlet 26 of the generator 10 while increasing the pressure and momentum of flow near the center of the outlet 26 of the generator 12. This differential at the outlets 26, 26 will cause an increase of flow in signal pickup 33 associated with the generator 12 and a decrease of flow in the tube 33 associated with the generator 14 to divert the jet in the inlet conduit 36 from the amplifier 32 from its straight path more toward the outlet passage 38. Thus, there is created a differential in pressure between the outlet passages 38 and 42, the greater pressure being in the passage 38. The fact that there is greater pressure in the passage 38 than in the passage 42 provides the pressure signal indicating the direction of body rotation on the axis X—X. The amount of the differential between the passages 38 and 42 signals the rate of such rotation, because the greater the rate, the greater the differential will be. This composite signal expressed in terms of pressure at the outlet passages 38 and 42 is much amplified over the outlet pressures in the vortex outlets 26, 26 and, obviously, this pressure signal can be used in a control function for controlling the rotation of the body by means of a stabilizer or the like.

On the other hand, if the angular movement of the body about the axis X—X is opposite to that just described, a reduced pressure will exist at the center of the outlet 26 for the generator 12 and in increased pressure will occur at the center of the outlet 26 for the generator 10. This will divert the jet flow through the amplifier 32 more toward the outlet passage 42, creating a differential between the outlet passages 38 and 42 which is much amplified over the differential existing in the outlets 26, 26. The greater pressure occurring in the outlet passage 42 indicates the direction of rotation of the body, and the amount of the differential existing between the passages 38 and 42 is indicative of the rate of rotational movement of the body. Here again, the composite signal, expressed in terms of pressure, can be used in a stabilizing or other control function for the body.

The invention claimed is:

1. A device for sensing the rate of angular movement of a body on an axis, the body having means defining a pair of chambers adapted to establish vortex flow about said axis but in opposite directions, each of said chambers having an inlet to and an outlet from its vortex path with the outlets of said chambers being disposed on said axis in spaced apart opposed relationship to each other, means disposed between said outlets for comparing the pressure of fluid at said outlets and for providing a signal in the event of a differential in said pressures, said means comprising a proportional amplifier having an inlet passage and at least two outlet passages for the flow of fluid under pressure therethrough, said inlet passage being arranged with respect to the outlets of said chambers so that a differential in pressure between the chamber outlets will divert the said flow of fluid more toward one of said two outlet passages than the other and thereby establish said pressure differential signal between said two outlet passages, and whereby angular movement of said body on said axis will increase the pressure differential from inlet to outlet of one chamber while decreasing the differential from inlet to outlet of the other chamber to establish an outlet pressure differential signal which is proportional to the rate of such angular movement.

2. A rate sensing device as set forth in claim 1 wherein said proportional amplifier has three outlet passages, one of which accommodates at least a portion of the fluid flow through the amplifier with the pressures in the other two amplifier outlet passages substantially equal when the chamber outlet pressures are substantially equal, and wherein said one outlet passage accommodates less of said fluid flow through the amplifier while one of said other outlet passages increases in pressure and the other reduces in pressure when a pressure differential occurs between the chamber outlets, the pressure differential between said other two outlet passages providing the signal which is indicative of the rate and direction of body movement.

3. A device for sensing the rate of angular movement of a body on an axis, said device comprising a pair of vortex generators each of which has an inlet and a plenum chamber at one end, a conical vortex chamber in communication with the plenum chamber and having an outlet at its other end on said axis and on the centerline of said vortex chamber, and means for comparing the pressure of fluid at said outlets and for providing a signal in the event of a differential in said outlet pressures, whereby angular movement of said body on said axis will increase the pressure differential from inlet to outlet of one vortex chamber while decreasing the differential from inlet to outlet of the other to establish an outlet pressure differential signal which is proportional to the rate of such angular movement.

4. A rate sensing device as set forth in claim 3 wherein the said chamber outlets are opposed to each other and spaced apart on said axis with the means for comparing the pressures at the outlets and for providing a signal disposed between said outlets.

5. A rate sensing device as set forth in claim 4 wherein the means for comparing the pressures at the outlets and for providing a signal comprises a proportional amplifier having an inlet passage and at least two outlet passages for the flow of fluid under pressure therethrough, said inlet passage being arranged with respect to the outlets of said chambers so that a differential in pressure between the chamber outlets will divert the said flow of fluid more toward one of said two outlet passages than the other and thereby establish said pressure differential signal between said two outlet passages.

6. A rate sensing device as set forth in claim 5 wherein said proportional amplifier has three outlet passages, one of which accommodates at least a portion of the fluid flow through the amplifier with the pressures in the other two amplifier outlet passages substantially equal when the chamber outlet pressures are substantially equal, and wherein said one outlet passage accommodates less of said fluid flow through the amplifier while one of said other outlet passages increases in pressure and the other reduces in pressure when a pressure differential occurs between the chamber outlets, the pressure differential between said other two outlet passages providing the signal which is indicative of the rate and direction of body movement.

References Cited

UNITED STATES PATENTS

| | | | |
|---|---|---|---|
| 3,372,596 | 3/1968 | Keller | 73—505 |
| 3,261,209 | 7/1966 | Rae | 73—194 X |
| 3,198,214 | 8/1965 | Lorenz | 137—81 |
| 3,216,439 | 11/1965 | Manion | 137—81 |
| 3,272,213 | 9/1966 | Jones | 137—81 |
| 3,320,815 | 5/1967 | Bowles | 73—505 |

RICHARD C. QUEISSER, *Primary Examiner.*

EDWARD D. GILHOOLY, *Assistant Examiner.*

U.S. Cl. X.R.

137—81.5